May 22, 1934.  J. PITRE ET AL  1,960,122
ANIMAL TRAP
Filed Sept. 26, 1932   2 Sheets-Sheet 2
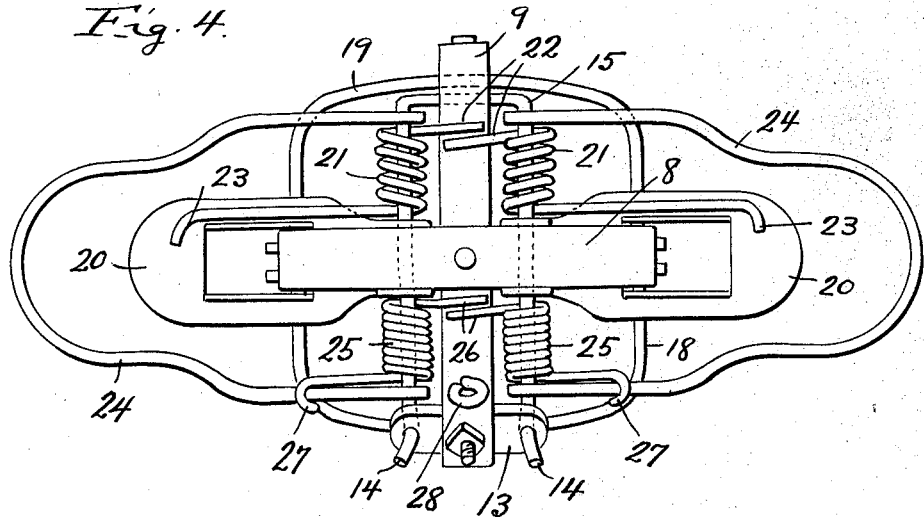
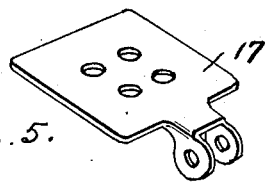
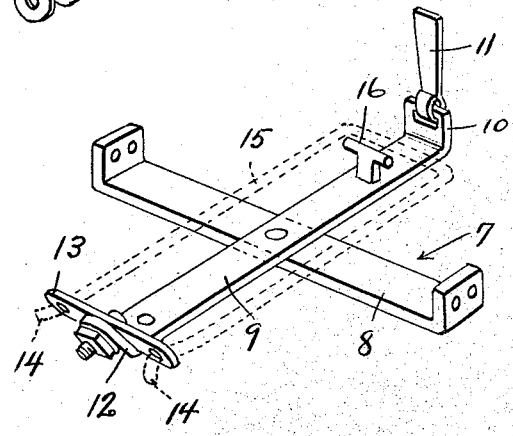
Inventors
John Pitre
Elfer Pitre
By Clarence A. O'Brien
Attorney Patented May 22, 1934

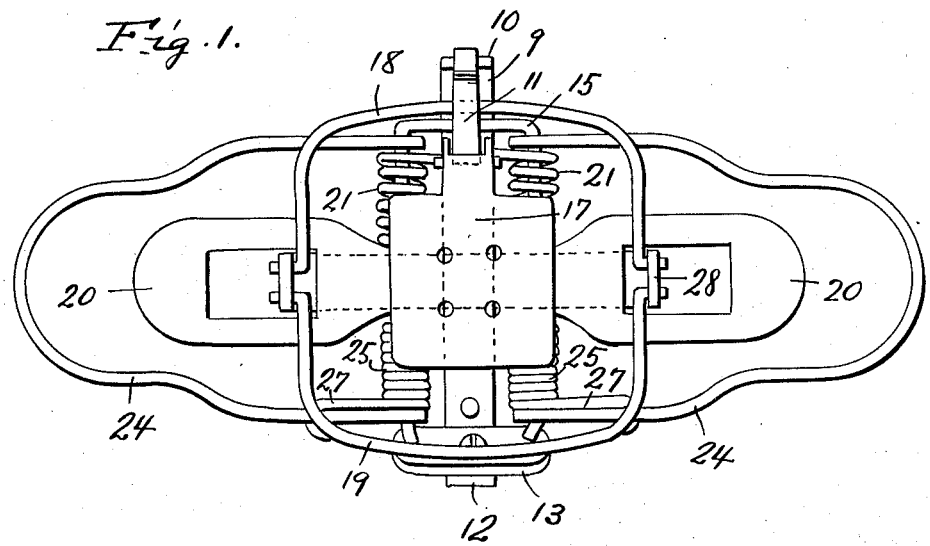
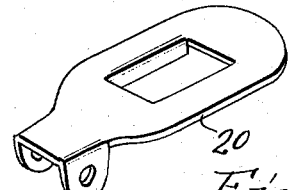
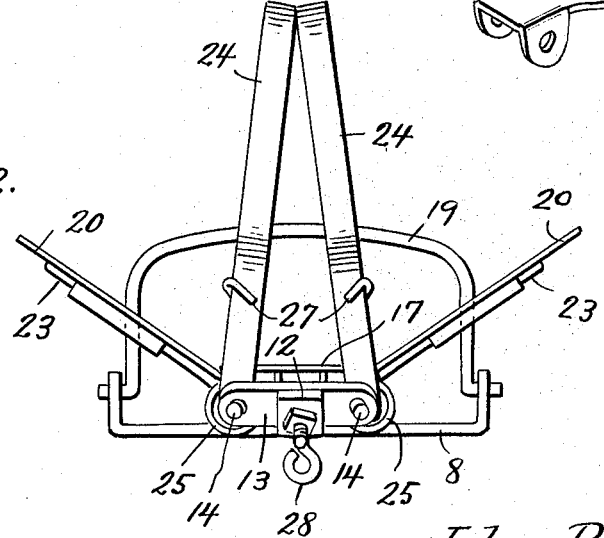

1,960,122

UNITED STATES PATENT OFFICE 1,960,122

ANIMAL TRAP

John Pitre and Elfer Pitre, Thibodaux, La.

Application September 26, 1932, Serial No. 634,946

3 Claims. (Cl. 43—88)

This invention relates to an improved animal trap and it has more specific reference to an out-of-doors type of trap such as is used by trappers of fur bearing animals and the like, which type of trap generally embodies a base frame and a pair of spring-closed jaws.

More specifically stated, the aforesaid form of trap generally includes a pair of duplicate spring-closed jaws pivotally mounted on an appropriate and a suitably anchored base, together with an animal tripped treadle plate for automatically releasing the jaws which permits the trap to be sprung. Despite the fact that traps of this kind are frequently used, they are nevertheless considered inefficient, due to the fact that they frequently catch only the legs of the animal, permitting the animal to sometimes free itself by gnawing the trapped legs off.

As a safeguard and to add to the general efficiency of this variety of trap, we have added thereto a pair of simultaneously operable supplementary jaws of a larger type, swingable in directions at right angles to the ordinary jaws and fashioned to grab the body of the animal so that it will be securely maintained in the trap for subsequent removal without undue mutilation.

In carrying the principle of the present invention into practice, we have discovered an arrangement which is efficient in performance, positive and dependable in action, relatively simple and otherwise capable of fulfilling the requirements of a structure of this class.

In addition to the pair of supplemental body grabbing jaws, a further feature is predicated upon the use of a single latch, whereby to render the trap far more sensitive and therefore more susceptible of expeditious action.

An explicit analysis of the preferred embodiment of the invention depicted in the accompanying illustrated drawings will disclose additional features and advantages.

In the drawings, wherein like numerals are employed to designate like parts throughout the different views:

Figure 1 is a top plan view of a trap designed and constructed in accordance with the present inventive conception showing the complete ensemble of jaws swung to open position ready for trapping.

Figure 2 is an elevational view showing the trap closed.

Figure 3 is a detail perspective view.

Figure 4 is a bottom plan view of the structure shown in Figure 1.

Figure 5 is a detail perspective view.

Figure 6 is a perspective view showing the cruciform base.

Attention is first invited to Figure 6, wherein the base 7 is shown as of general cruciform configuration in top plan view. It is made up of a pair of companion metal bars 8 and 9 disposed in intersecting relationship and rigidly connected together at their central portion.

Attached to the upturned end 10 of the bar 9 is a latch 11. Attached to the opposite end 12 is an apertured retaining bracket 13 which bracket serves to receive the opposite end portion 14 of the arms of a U-shaped frame 15. The numeral 16 merely designates a substantially T-shaped stud to which the animal actuated treadle plate 17 is pivotally connected. The pivoted end of the plate 17 is constructed as shown to permit the latch 11 to engage therewith as shown in Figure 1 when the trap is set.

As previously intimated, the conventional jaws, which are pivotally connected to the opposite ends of the bar 8 are distinguished by the numerals 18 and 19 respectively. The means for swinging these jaws to gripping position comprises a pair of duplicate ears 20 pivotally attached to the intermediate portions of the arms of the U-shaped wire frame 15.

As shown better in Figures 1 and 4, this frame serves also to accommodate a pair of coiled springs 21 having their short free end portions 22 bearing against the underside of the bar 9. The opposite free end portions 23 are engaged beneath the ears 20 in order to swing said ears upwardly for forcing the jaws 18 and 19 together.

The supplemental body gripping jaws 24 are of general U-shaped configuration and pivotally attached to the frame 15, said jaws being swingable at right angles to the jaws 18 and 19 and being sufficiently large to grasp the body of the trapped animal therebetween.

Additional coil springs 25 are provided for closing the jaws 24, said springs being mounted on the wire frame 15 and having their end portions 26 engaged with the underside of the bar 9 as shown in Figure 4 and their hooked free end portions 27 engaged with the adjacent arms of the jaws 24. The numeral 28 merely designates an eye to which an anchoring chain (not shown) is connected.

The principal structural features of the invention are as follows: First, the provision of the enlarged body gripping jaws 24 swingable at right angles to the main jaws 18 and 19 simultaneously with the latter jaws is a feature of distinction. Secondly, the provision of the features 13 and 15 adding the requisite details to the base 7 to permit the jaws 24 to be properly mounted in place is an equally important feature. Then too, this elongated U-shaped wire frame 15 has the additional function of accomodating the spaced parallel springs 21 for closing the jaws 18 and 19 as well as the supplementary springs 25 for closing the additional jaws 24.

As previously pointed out, the provision of a single latch 11 co-operating with the pivoted end of the treadle plate 17 is a further feature of simplication and novelty.

The features forming the composite base 7 illustrated in Figure 6 form what may be claimed as an additional advantageous assembly by simply adding the parts 13 and 15 whereby to accomodate all springs as well as the auxiliary body gripping jaws 24.

It is thought from the foregoing description that the advantages and novel features of the invention will be readily apparent.

It is to be understood that changes may be made in the construction and in the combination and arrangement of the several parts provided that such changes fall within the scope of the appended claims.

We claim:

1. An animal trap comprising a base, a pair of main companion jaws swingably attached to said base and movable toward and from each other, an animal actuated treadle plate hingedly attached to the base, a latch carried by said base and co-operable with said plate and the adjacent jaw for holding said jaws in open position, a U-shaped member embodied in said base and forming a part thereof, a pair of primary springs mounted on said U-shaped member and co-operable with the base, a pair of opposed ears pivotally attached to said U-shaped member and engaged by the springs and co-operable with the pivoted ends of said jaws for swinging the jaws to closed position under the action of the springs, and a pair of spring-pressed supplementary jaws attached to said U-shaped member and swingable at right angles to the first named jaws and constructed to embrace the body of the trapped animal.

2. In a trap of the class described, a composite base for use and association with an animal trap of the class described comprising a pair of intersecting bars centrally secured together, a pivoted latch attached to one end of one of said bars, an apertured bracket attached to the opposite end of said bar, a substantially U-shaped frame overlying said bar members and having its free end portion attached to said bracket.

3. An animal trap comprising a base including a U-shaped wire frame and a pivotally mounted retaining latch, a pair of main gripping jaws swingably connected to said base, a pair of supplementary larger jaws hingedly connected to said U-shaped frame and swingable at right angles to said first-named jaws, two pairs of coil springs mounted on the arm portions of said U-shaped frame and operatively connected with the base and jaws for simultaneously swinging all of said jaws to closed trapping position.

JOHN PITRE.
ELFER PITRE.